United States Patent
Choi

(10) Patent No.: US 9,656,230 B2
(45) Date of Patent: May 23, 2017

(54) PROCESS FOR UPGRADING HEAVY AND HIGHLY WAXY CRUDE OIL WITHOUT SUPPLY OF HYDROGEN

(71) Applicant: Saudi Arabian Oil Company, Dhahran (SA)

(72) Inventor: Ki-Hyouk Choi, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 225 days.

(21) Appl. No.: 14/338,749

(22) Filed: Jul. 23, 2014

(65) Prior Publication Data

US 2014/0334985 A1 Nov. 13, 2014

Related U.S. Application Data

(63) Continuation of application No. 12/277,255, filed on Nov. 24, 2008, now Pat. No. 8,815,081.

(60) Provisional application No. 60/990,662, filed on Nov. 28, 2007, provisional application No. 60/990,648, filed on Nov. 28, 2007, provisional application No. 60/990,658, filed on Nov. 28, 2007, provisional application No. 60/990,670, filed on Nov. 28, 2007, provisional application No. 60/990,641, filed on Nov. 28, 2007.

(51) Int. Cl.
| | | |
|---|---|---|
| *B01J 3/00* | (2006.01) | |
| *C10G 9/00* | (2006.01) | |
| *C10G 31/08* | (2006.01) | |
| *C10G 45/26* | (2006.01) | |
| *C10G 47/32* | (2006.01) | |
| *C10G 75/00* | (2006.01) | |
| *E21B 43/16* | (2006.01) | |

(52) U.S. Cl.
CPC ............ *B01J 3/008* (2013.01); *C10G 9/00* (2013.01); *C10G 31/08* (2013.01); *C10G 45/26* (2013.01); *C10G 47/32* (2013.01); *C10G 75/00* (2013.01); *E21B 43/16* (2013.01); *C10G 2300/1033* (2013.01); *C10G 2300/202* (2013.01); *C10G 2300/205* (2013.01); *C10G 2300/206* (2013.01); *C10G 2300/4081* (2013.01); *C10G 2300/805* (2013.01)

(58) Field of Classification Search
CPC ........................................................ B01J 3/008
See application file for complete search history.

(56) References Cited

U.S. PATENT DOCUMENTS

| | | | |
|---|---|---|---|
| 2,135,332 A | 11/1938 | Gary | |
| 2,623,596 A | 12/1952 | Whorton et al. | |
| 3,325,395 A | 6/1967 | Ban | |
| 3,948,754 A | 4/1976 | McCollum et al. | |
| 3,948,755 A | 4/1976 | McCollum et al. | |
| 3,960,706 A | 6/1976 | McCollum et al. | |
| 3,983,027 A | 9/1976 | McCollum et al. | |
| 3,989,618 A | 11/1976 | McCollum et al. | |
| 4,005,005 A | 1/1977 | McCollum et al. | |
| 4,118,797 A | 10/1978 | Tarpley, Jr. | |
| 4,243,514 A | 1/1981 | Bartholic | |
| 4,243,633 A | 1/1981 | Hozuma et al. | |
| 4,443,325 A | 4/1984 | Chen et al. | |
| 4,446,012 A | 5/1984 | Murthy et al. | |
| 4,448,251 A | 5/1984 | Stine | |
| 4,483,761 A | 11/1984 | Paspek, Jr. | |
| 4,529,037 A | 7/1985 | Froning et al. | |
| 4,543,177 A | 9/1985 | Murthy et al. | |
| 4,543,190 A * | 9/1985 | Modell .................... | C02F 1/00 210/721 |
| 4,550,198 A * | 10/1985 | Myerson ................ | C07C 51/43 562/485 |
| 4,684,372 A | 8/1987 | Hayes et al. | |
| 4,733,724 A | 3/1988 | Cardenas et al. | |
| 4,753,666 A | 6/1988 | Pastor et al. | |
| 4,813,370 A | 3/1989 | Capamaggio | |

(Continued)

FOREIGN PATENT DOCUMENTS

| | | |
|---|---|---|
| EP | 199555 | 10/1986 |
| EP | 423960 | 4/1991 |

(Continued)

OTHER PUBLICATIONS

Final Office Action from co-pending U.S. Appl. No. 12/277,263 dated Dec. 2, 2014.
Final Office Action from co-pending U.S. Appl. No. 12/277,263 dated May 17, 2012.
Office Action from co-pending U.S. Appl. No. 12/277,263 dated Jun. 18, 2014.
Office Action from co-Pending U.S. Appl. No. 12/277,263 dated Sep. 30, 2011.
Adschiri et al. "Catalytic Hydrodesulfurization of Dibenzothiohene through Partial Oxidation and Water-Gas Shift Reaction in Supercritical Water", published on Ind. Eng. Chem. Res., vol. 37, pp. 2634-2638, (1998).

(Continued)

*Primary Examiner* — Randy Boyer
(74) *Attorney, Agent, or Firm* — Bracewell LLP; Constance Gall Rhebergen

(57) ABSTRACT

A continuous process to upgrade heavy crude oil for producing more valuable crude feedstock having high API gravity, low asphaltene content, and high middle distillate yield, low sulfur content, low nitrogen content, and low metal content without external supply of hydrogen and/or catalyst. Heavy crude oil having substantial amount of asphaltene and heavy components is mixed with highly waxy crude oil having large amount of paraffinic components and water to decompose asphaltene compounds and remove sulfur, nitrogen, and metal containing substances under supercritical conditions. Product has higher API gravity, lower asphaltene content, high middle distillate yield, lower sulfur content, lower nitrogen content, and lower metal content to be suitable for conventional petroleum refining process.

5 Claims, 10 Drawing Sheets

(56) References Cited

U.S. PATENT DOCUMENTS

| | | | |
|---|---|---|---|
| 4,818,370 A * | 4/1989 | Gregoli | C10G 9/007 166/256 |
| 4,840,725 A | 6/1989 | Paspek | |
| 4,951,561 A | 8/1990 | Moorman et al. | |
| 5,096,567 A | 3/1992 | Paspek, Jr. et al. | |
| 5,110,443 A | 5/1992 | Gregoli et al. | |
| 5,133,877 A | 7/1992 | Rofer et al. | |
| 5,316,659 A | 5/1994 | Brons et al. | |
| 5,466,365 A | 11/1995 | Savastano et al. | |
| 5,496,464 A | 3/1996 | Piskorz et al. | |
| 5,674,405 A | 10/1997 | Bourhis et al. | |
| 5,725,054 A | 3/1998 | Shayegi et al. | |
| 5,778,977 A | 7/1998 | Bowzer et al. | |
| 5,851,381 A | 12/1998 | Tanaka et al. | |
| 5,871,636 A | 2/1999 | Trachte et al. | |
| 5,871,637 A | 2/1999 | Brons | |
| 5,885,440 A | 3/1999 | Hoehn et al. | |
| 5,904,839 A | 5/1999 | Brons | |
| 5,914,031 A | 6/1999 | Sentagnes et al. | |
| 5,928,502 A | 7/1999 | Bearden et al. | |
| 6,280,408 B1 | 8/2001 | Sipin | |
| 6,325,921 B1 | 12/2001 | Andersen | |
| 6,328,104 B1 | 12/2001 | Graue | |
| 6,475,396 B1 | 11/2002 | Wofford, III et al. | |
| 6,489,263 B2 | 12/2002 | Murray et al. | |
| 6,547,957 B1 | 4/2003 | Sudhakar et al. | |
| 6,709,601 B2 | 3/2004 | Wofford, III et al. | |
| 6,764,213 B2 | 7/2004 | Shechter | |
| 6,767,452 B1 | 7/2004 | Siskin et al. | |
| 6,878,290 B2 | 4/2005 | Joussot-Dubien et al. | |
| 7,144,498 B2 | 12/2006 | McCall et al. | |
| 7,740,065 B2 | 6/2010 | Choi | |
| 8,025,790 B2 | 9/2011 | Choi et al. | |
| 8,815,081 B2 | 8/2014 | Choi | |
| 2001/0035006 A1 | 11/2001 | Dou et al. | |
| 2002/0046838 A1 | 4/2002 | Karanikas et al. | |
| 2002/0173682 A1 | 11/2002 | Tullio et al. | |
| 2003/0168381 A1 | 9/2003 | Hokari et al. | |
| 2005/0167333 A1 | 8/2005 | McCall et al. | |
| 2006/0011511 A1 | 1/2006 | Hokari et al. | |
| 2006/0042999 A1 | 3/2006 | Iqbal et al. | |
| 2006/0157339 A1 | 7/2006 | Cullen | |
| 2006/0231455 A1 | 10/2006 | Olsvik et al. | |
| 2007/0045881 A1 | 3/2007 | Aguirre | |
| 2007/0056881 A1 | 3/2007 | Berkowitz et al. | |
| 2007/0090021 A1 | 4/2007 | McCall et al. | |
| 2007/0140935 A1 | 6/2007 | Hazlebeck | |
| 2007/0289898 A1 | 12/2007 | Banerjee | |
| 2008/0066918 A1 | 3/2008 | Smith | |
| 2008/0073292 A1 | 3/2008 | Stenmark et al. | |
| 2008/0099373 A1 | 5/2008 | Hokari et al. | |
| 2008/0099374 A1 | 5/2008 | He et al. | |
| 2008/0099376 A1 | 5/2008 | He et al. | |
| 2008/0099377 A1 | 5/2008 | He et al. | |
| 2008/0099378 A1 | 5/2008 | He et al. | |
| 2008/0121565 A1 | 5/2008 | Yoo et al. | |
| 2008/0149533 A1 | 6/2008 | Yoo et al. | |
| 2008/0264873 A1 | 10/2008 | Gidner | |
| 2009/0008291 A1 | 1/2009 | Chabot et al. | |
| 2009/0145805 A1 | 6/2009 | Choi | |
| 2009/0178952 A1 | 7/2009 | Choi et al. | |
| 2011/0147266 A1 | 6/2011 | Choi | |

FOREIGN PATENT DOCUMENTS

| | | |
|---|---|---|
| EP | 0978552 A2 | 2/2000 |
| EP | 2000282063 | 10/2000 |
| EP | 1342771 | 9/2003 |
| EP | 1505141 | 2/2005 |
| EP | 1537912 | 6/2005 |
| EP | 1616931 | 1/2006 |
| EP | 1826527 | 8/2007 |
| JP | 2000100850 | 4/2000 |
| JP | 2000104311 | 4/2000 |
| JP | 2001192676 | 7/2001 |
| JP | 2003049180 | 2/2003 |
| JP | 2003277770 | 10/2003 |
| JP | 2006104311 | 4/2006 |
| WO | 02072735 a2 | 9/2002 |
| WO | 2005007776 | 1/2005 |
| WO | 2006037368 A1 | 4/2006 |
| WO | 2008085436 | 7/2008 |
| WO | 2009085436 A1 | 7/2009 |
| WO | 2009085461 A1 | 7/2009 |

OTHER PUBLICATIONS

Adschiri et al. "Hydrogenation through Partial Oxidation of Hydrocarbon in Supercritical Water", published on Int. J. of the Soc. of Mat. Eng. for Resources. vol. 7, No. 2, pp. 273-281, (1999).

Amestica, L.A. and Wolf, E.E., Catalytic Liquefaction of Coal with Supercritical Water/CO/Solvent Media, XP-002663069, Fuel, Sep. 30, 1986, pp. 1226-1332, vol. 65, Butterworth & Co. (1986).

Ancheyta, Jorge; Petroleum Refining; Modeling and Simulation of Catalytic Reactors for Petroleum Refining, First Edition; 2011: pp. 1-52; John Wiley & Sons, Inc.

B. Abismail et al., "Emulsification by ultrasound: drop size distribution and stability," Ultrasonics Sonochemistry, vol. 6, 1999, pp. 75-83, Elsevier Science B.V.

Choi et al., "Petroleum Upgrading Process," U.S. Appl. No. 12/881,807, filed Sep. 14, 2010.

Department of Trade of Industry of the United Kingdom, "Technology Status Report—Coal Liquefaction", Cleaner Coal Technology Programme, Oct. 31, 1999, pp. 1-14.

Hemmingsen et al. "Structural Characterization and Interfacial Behavior of Acidic Compounds Extracted from a North Sea Oil", Energy & Fuels, in press, (2006).

International Search Report with Written Opinion issued in related PCT Patent Application PCT/US2011/051183; dated Nov. 23, 2011; 10 pages.

Jiunn-Ren Lin et al., "An Upgrading Process Through Cavitation and Surfactant," Energy & Fuels 1993, vol. 7, pp. 111-118, American Chemical Society.

M.A. McHugh & V.J. Krukonis "Supercritical Fluid Extraction", 2nd ed., Butterworth-Heinemann, 1994, pp. 339-416.

Manning et al. "Chapter 2: Characterization of Crude Oils" Oilfield Processing, vol. 2: Crude Oil, 1995, pp. 5-23.

International Search Report issued in related PCT Patent Application No. PCT/US2010/060728; dated Jan. 3, 2011; 3 pages.

International Search Report issued in related PCT Patent Application No. PCT/US2011/051192; dated Nov. 21, 2011; 11 pages.

R.J. Parker et al., "Liquefaction of Black Thunder Coal with Counterflow Reactor Technology," Ninth Pittsburgh Coal Conference Oct. 1992, Oct. 31, 1992, pp. 1191-1195.

Robinson, P.R. and Kraus, L.S., "Thermocherninstry of Coking in Hydroprocessing Units: Modeling Competitive Naphthalene Saturation & Condensation Reactions," XP-002663070 Apr. 26, 2006, Retrieved from Internet (see attached PCT Int'l Search Report dtd Nov. 21, 2011).

S. Kentish et al., "The use of ultrasonics for nanoemulsion preparation," Innovative Food Science and Emerging Technologies, vol. 9, 2008, pp. 170-175, Elsevier Ltd.

Sato, Takafumi et al., "Upgrading of Asphalt With and Without Partial Oxidation in Supercritical Water," Fuel 82 (2003) pp. 1231-1239, Elsevier.

Seid Mandi Jafari et al., "Production of sub-micron emulsions by ultrasound and microfiuidization techniques;" Journal of Food Engineering, vol. 82, Science Direct, 2007, pp. 478-488, Elsevier Ltd.

Subramanian et al., "Compositional Analysis of Bitumen and Bitumen-Derived Products", Journal of Chromatographic Science, Jan. 1996, pp. 20-26, vol. 34.

T.S.H. Leong et al., "Minimising oil droplet size using ultrasonic emulsification," Ultrasonics Sonochemistry vol. 16, 2009, pp. 721-727, Elsevier B.V.

(56) References Cited

OTHER PUBLICATIONS

Zhao et al. "Experimental Study on Vacuum Residuum Upgrading through Pyrolysis in Supercritical Water", published on Energy & Fuels, vol. 20, pp. 2067-2011, (2006).
Wiehe, "A Phase-Separation Kinetic Model for Coke Formation," 32 Ind. Eng. Chem. Res.; 1093; pp. 2447-2454.
Al Shareef et al., "Effect of Chemical Structure on the Cracking and Coking Archipelago Model Compounds Representative of Asphaltenes," 26 Energy Fuels; 2012; pp. 1828-1843.
Williams "Refiners' Future Survival Hinges on Adapting to Changin Feedstocks, Product Specs", Oil & Gas Journal, vol. 101, No. 31, (2003).
Laredo et al. "Identification of Naphthenic Acids and Other Corrosivity-related Characteristics in Crude Oil and Vacuum Gas Oils from a Mexican Refinery", Energy & Fuels, vol. 18, pp. 1687-1694, (2004).
N.A. Tomczyk & R.E. Winans "On the nature and Origin of Acidic Species in Petroleum. 1. Detailed Acid Type Distribution in a California Crude Oil", Energy & Fuels, vol. 15, pp. 1498-1504, (2001).
Saab et al. "Quantitative Extraction Procedure of Naphthenic Acids Contained in Crude Oils. Characterization with Different spectroscopic Methods", Energy & Fuels, vol. 19, pp. 525-531, (2005).
Watanabe et al. "Decomposition of a Long Chain Saturated Fatty Acid with Some Additives in Hot Compressed Water", Energy Conversion and management, in press, (2006).

\* cited by examiner

PROCESS FOR UPGRADING HEAVY AND HIGHLY WAXY CRUDE OIL WITHOUT SUPPLY OF HYDROGEN

RELATED APPLICATIONS

This patent application claims priority to U.S. Provisional Patent Application Ser. Nos. 60/990,662; 60/990,648; 60/990,658; 60/990,670; and 60/990,641 filed on Nov. 28, 2007, and is a continuation of U.S. patent application Ser. No. 12/277,255, filed Nov. 24, 2008, which are all incorporated by reference in their entireties.

TECHNICAL FIELD OF THE INVENTION

The present invention relates to a continuous process for upgrading heavy crude oil and highly waxy crude oil to produce more valuable crude oil feedstock having a higher API gravity; lower asphaltene content; lower content of sulfur, nitrogen and metallic impurities; increased middle distillate yield; and/or reduced pour point.

BACKGROUND OF THE INVENTION

The petroleum industry has long sought to find new methods for treating heavy crude oils, highly waxy crude oils, and other petroleum materials in an effort to meet the ever-increasing demand for petroleum feedstocks and improve the quality of available crude oils used in refinery processes.

In general, heavy crude oils have a low API gravity, high asphaltene content, low middle distillate yield, high sulfur content, high nitrogen content, and high metal content. These properties make it difficult to refine heavy crude oil by conventional refining processes to produce end petroleum products with specifications that meet strict government regulations.

Many petroleum refineries perform conventional hydroprocessing after distilling crude oil into various fractions. Each fraction is then hydroprocessed separately. Therefore, refineries must utilize complex unit operations to handle each fraction. Further, significant amounts of hydrogen and expensive catalysts are utilized in conventional hydrocracking and hydrotreating processes under severe reaction conditions to increase the yield from heavy crude oil towards more valuable middle distillates and to remove impurities such as sulfur, nitrogen, and metals.

Additionally, distillation and/or hydroprocessing of heavy crude oil feedstock produces large amounts of asphaltene and heavy hydrocarbons, which must be further cracked and hydrotreated to be utilized. Conventional hydrocracking and hydrotreating processes for asphaltenic and heavy fractions also require high capital investments and substantial processing.

Currently, large amounts of hydrogen are used to adjust the properties of fractions produced from conventional refining processes in order to meet required low molecular weight specifications for the end products; to remove impurities such as sulfur, nitrogen, and metal; and to increase the hydrogen-to-carbon ratio of the matrix. Hydrocracking and hydrotreating of asphaltenic and heavy fractions are examples of processes requiring large amounts of hydrogen, and these two processes result in the catalyst having a reduced life cycle.

Supercritical water has been utilized as a reaction medium for cracking of hydrocarbons with the addition of an external source of hydrogen. Water has a critical point at about 705° F. (374° C.) and about 22.1 MPa. Above these conditions, the phase boundary between liquid and gas for water disappears, with the resulting supercritical water exhibiting high solubility toward organic compounds and high miscibility with gases. Furthermore, supercritical water stabilizes radical species.

However, utilizing supercritical water, without the use of external hydrogen as the reaction media for cracking, has some disadvantages such as coke formation, which occurs during the upgrading of hydrocarbons in the supercritical water fluid. Although the amount of coke produced from upgrading hydrocarbon in this manner is less than that produced by conventional thermal coking processes, coking must be minimized to increase liquid yield and improve the overall stability of process operation.

It is known in the industry that coke formation occurs in cracking using supercritical water if there is only a limited availability of hydrogen and feed hydrocarbon has high aromaticity. Several proposals have been suggested to supply external hydrogen to a feed hydrocarbon treated with supercritical water fluid. For example, hydrogen gas can be added directly to the feed stream. Carbon monoxide can also be added directly to the feed stream to generate hydrogen through a water-gas-shift (WGS) reaction between carbon monoxide and water. Organic substances such as formic acid can also be added to the feed stream to generate hydrogen through a WGS reaction with carbon monoxide, which is produced from decomposition of added organic substances and water. Additionally, a small amount of oxygen can be included in the feed stream to allow for oxidation within the feed matrix for generating carbon monoxide. This carbon monoxide can then be used in a WGS reaction for producing hydrogen. However, feeding external as and/or organic substances into a liquid stream increases costs and introduces added complexity to the process.

Highly waxy crude oil contains substantial quantities of paraffinic compounds that have elevated boiling points and considerable molecular weights. These properties result in high pour points and difficulties in the transferring capability of the crude oil through pipelines and oil tankers. Thus, highly waxy crude oil has come to be regarded as a non-conventional petroleum source. Furthermore, the highly waxy crude oil has a very low content of unsaturated hydrocarbons, which makes it unsuitable as a feedstock for most current refining processes and petrochemical processes. For example, to distill straight-run naphtha from highly waxy crude oil requires severe reforming treatment to increase aromatic and olefinic contents for improving octane rating of motor gasoline.

Upgrading of highly waxy crude oil is possible through conventional thermal or catalytic cracking, but such treatment produces substantial amounts of coke and consumes large amounts of hydrogen and catalyst. In addition to thermal and catalytic cracking, the problems caused by the high pour point of highly waxy crude oil can be reduced by solvent dewaxing and/or addition of pour point depressants. However, all of these methods suffer disadvantages.

As noted earlier, thermal coking produces large amounts of solid coke as a by-product, which is an indicator of the loss of valuable hydrocarbon feedstock. Catalytic hydrocracking requires large amounts of hydrogen and the regular replacement of spent catalyst. Solvent dewaxing requires a wax disposing system and a solvent recovery system, which adds to complexity and expense. Pour point depressants are expensive and change the end product in undesirable ways.

Therefore, it would be desirable to have an improved process for upgrading heavy and highly waxy crude oils with supercritical water fluid that requires neither an external supply of hydrogen nor the presence of an externally supplied catalyst. It would be advantageous to create a continuous process and apparatus that allows for the upgrade of the whole crude oil, rather than the individual fractions, to reach the desired qualities such that the refining process and various supporting facilities can be simplified. Furthermore, it would be desirable to have a process that could be implemented at the production site without the use of complex equipment. Additionally, it would be most desirable to make the process be one that is conducted in a continuous fashion.

SUMMARY OF THE INVENTION

The present invention is directed to a continuous process that satisfies at least one of these needs. The invention includes a continuous process for upgrading a heavy crude oil feed stream in the absence of externally supplied hydrogen. In one embodiment of the present invention, a mixture of heavy crude oil and highly waxy oil are contacted together in the presence of water under conditions that exceed the supercritical point of water. Furthermore, there is an absence of externally supplied hydrogen during this mixing step. In contacting the heavy crude oil and highly waxy crude oil under supercritical conditions, at least a portion of hydrocarbons within the mixture will undergo cracking. The mixture is then cooled, depressurized, and separated into a gas portion and a liquid portion. The liquid portion is then further separated into recovered water and upgraded oil, whereby the upgraded oil is an upgraded heavy crude oil having reduced amounts of asphaltene, sulfur, nitrogen and metal containing substances in comparison with the heavy crude oil.

In an alternate embodiment of the present invention, the continuous process includes combining a heavy crude oil feed with a water feed in the presence of highly waxy crude oil to create a modified heavy crude oil/water mixture. The modified heavy crude oil/water mixture, which is maintained at a pressure exceeding the critical pressure of water, which is about 22.1 MPa, undergoes temperature modifications in a reaction zone in order to force the water into a supercritical state, thereby providing a reaction medium for the upgrading of heavy crude oil without significant formation of coke. The reaction zone comprises an interior portion of a main reactor, the main reactor operable to withstand temperatures and pressures in excess of the critical temperature and critical pressure of water, and the reaction zone is essentially free of an externally-provided catalyst and essentially free of an externally-provided hydrogen source. The highly waxy crude oil supplies enough hydrogen to break the large asphaltenic molecules contained in the heavy crude oil. Additionally, desulfurization, denitrogenation and demetallation processes are accelerated by the presence of the highly waxy crude oil.

Once the modified heavy crude oil/water mixture reaches an appropriate temperature and pressure, at least a portion of the hydrocarbons in the mixture undergo cracking, resulting in a hot adapted-mixture. This hot adapted-mixture is subsequently cooled and relieved of its increased pressure, creating a pressure-reduced adapted mixture. The pressure-reduced adapted mixture is then separated into a gas portion and a liquid portion, where the liquid portion is made up of an upgraded oil/water mixture. The final upgraded oil product, which has a higher API gravity; reduced amounts of asphaltene, sulfur, nitrogen or metal containing substances; and increased amounts of middle distillate yield as compared to the heavy crude oil, is collected by separating the upgraded oil/water mixture into its two components, upgraded oil and recovered water, using any suitable oil-water separator.

In an alternate embodiment, the reaction zone comprises an interior portion of a generally vertically oriented reactor, such that the modified heavy crude oil/water mixture flows downwardly through the generally vertically oriented reactor.

In an alternate embodiment of the present invention, the modified heavy crude oil/water mixture is fed into a heating zone prior to the reaction zone, wherein the modified heavy crude oil/water mixture is heated to a temperature in the range of about 150° C. to about 350° C. to form a pre-heated mixture. The pre-heated mixture is then introduced into the reaction zone, wherein the temperature within the reaction zone is increased to a target temperature that is at or above the critical temperature of water, such that at least some of the hydrocarbons of the pre-heated mixture undergo cracking, forming the hot adapted-mixture, the reactor being essentially free of an externally-provided catalyst and free of an externally-provided hydrogen source. The hot adapted mixture is cooled and depressurized forming the pressure-reduced adapted mixture. The pressure-reduced adapted mixture is then separated into the gas portion and the liquid portion, wherein the liquid portion is made up of the upgraded oil/water mixture. The final upgraded oil product, which has reduced amounts of asphaltene, sulfur, nitrogen or metal containing substances as compared to the heavy crude oil, is collected by separating the upgraded oil/water mixture into its two components, upgraded oil and recovered water, using any suitable liquid separator.

In other embodiments of the invention, the recovered water from the final liquid separation stage can be recombined with the water feed. In yet another embodiment of the invention, the recovered water can be treated in an oxidation reactor prior to recombining with the water feed using an oxidation step, so as to treat the recovered water by removing any oil residue or other impurities. In a further embodiment of this invention, the thermal energy contained in the product stream from the reaction zone and/or the oxidation reactor can be captured and used for heat exchange elsewhere in the process. Furthermore, the continuous process can be carried out without the aid of any externally supplied catalysts.

Additionally, the present invention provides a continuous process for converting highly waxy crude oil to more valuable hydrocarbon feedstock with a reduced waxy fraction and reduced level of impurities such as sulfur, nitrogen and metal without forming significant amount of coke and without an external supply of hydrogen or hydrogen-generating chemicals. The low-value, highly waxy crude oil is upgraded to conventional crude oil that has improved flowing properties for more effective transfer in pipeline and tankers.

In an alternate embodiment of the present invention, a method for producing upgraded hydrocarbon feedstock by supercritical water is provided. In this embodiment, the water feed is heated, preferably in the heating zone, to form a heated water stream, such that the heated water stream is in a supercritical state. The heavy crude oil is mixed with the highly waxy crude oil before or after combining the heavy crude oil with the heated water stream to create the pre-heated mixture. The pre-heated mixture then enters the reaction zone, which is maintained at a pressure exceeding the critical pressure of water, and is heated to a target temperature in the range of 705° F. to 1112° F. (374° C. to 600° C.). At this increased temperature and pressure, at least a portion of the hydrocarbons in the mixture undergo cracking, resulting in the hot adapted-mixture. This hot adapted-mixture is subsequently cooled and relieved of its increased pressure, creating the pressure-reduced adapted mixture. The pressure-reduced adapted mixture is then separated into the gas portion and the liquid portion, where the liquid portion is made up of the upgraded oil/water mixture. The final upgraded oil product, which has reduced amounts of asphaltene, sulfur, nitrogen or metal containing substances as compared to the heavy crude oil, is collected by separating the upgraded oil/water mixture into its two components, upgraded oil and recovered water, using any suitable liquid separator. At the same time, highly waxy crude oil is also upgraded to produce an upgraded oil product having a lower pour point and higher concentration of olefin and aromatic compounds.

In an alternate embodiment, the reaction zone comprises an interior portion of a main reactor, wherein the main reactor is comprised of a generally vertically oriented reactor, such that the pre-heated mixture flows downwardly through the generally vertically oriented reactor.

The upgraded oil preferably has a higher API gravity, lower asphaltene content, higher middle distillate yield, lower sulfur content, lower nitrogen content, and lower metal content than the original heavy crude oil feed, which allows for convenient processing in conventional petroleum refining processes. Also, an embodiment of the present invention provides an efficient and convenient method to upgrade heavy crude oil and/or highly waxy crude oil without forming significant amount of coke.

In an embodiment of this invention, supercritical water fluid provides an improved reaction medium for crude oils to be decomposed and cracked into low molecular weight hydrocarbons through facilitating mass diffusion, heat transfer, intra- or inter-molecular hydrogen migration, stabilizing of radical compounds for suppressing coke formation and increasing liquid yield, and removal of impurities. Furthermore, supercritical water fluid facilitates mass transfer, which increases reaction speed. In one embodiment, the residence time of the pre-heated mixture within the reaction zone is between 0.1 and 10 minutes, and more preferably between 1 and 3 minutes.

The present invention does not require an external supply of hydrogen and/or hydrogen generating chemicals because the paraffinic fraction of highly waxy crude oil serves as a hydrogen source. In addition, external catalysts are not required.

Additionally, the continuous process of the present invention can be easily utilized at the production site of the heavy crude oil or the highly waxy crude oil because the preferred embodiment does not require complex equipment or facilities associated with other processes that require hydrogen supply or coke removal systems. In one embodiment, the continuous process of the present invention is located at the highly waxy crude oil production site so as to minimize initial transportation costs.

In one embodiment of the present invention, a continuous process for upgrading a heavy crude oil in an environment free of an externally supplied catalyst or externally supplied hydrogen source is provided. The continuous process includes contacting a mixture of heavy crude oil and highly waxy oil in the presence of water under conditions that exceed the supercritical point of water. In doing this, at least a portion of hydrocarbons in the mixture of heavy crude oil and highly waxy oil undergo cracking. Advantageously, this cracking can be achieved in the absence of externally supplied hydrogen. Once the hydrocarbons are cracked, the mixture is then cooled and depressurized prior to separating the mixture into a gas portion and a liquid portion. The liquid portion is then further separated into recovered water and upgraded oil, whereby the upgraded oil is an upgraded heavy crude oil having reduced amounts of asphaltene, sulfur, nitrogen and metal containing substances in comparison with the heavy crude oil.

The present invention is also directed to an apparatus for upgrading heavy crude oil and highly waxy crude oil in an environment free of an externally supplied catalyst or externally supplied hydrogen source. In one embodiment of the present invention, the apparatus includes a mixing zone, a pre-heating zone, a high pressure pumping means, a reaction zone, a pressure regulating device, a liquid-gas separator, and a water-oil separator. In one embodiment, the mixing zone is operable to combine heavy crude oil and highly waxy crude oil with a water feed at a slightly elevated temperature. Slightly elevated temperatures are temperatures that are slightly elevated in comparison to ambient temperature. Exemplary elevated temperatures include temperatures in the range of 50-150 degrees C. The pre-heating zone is fluidly connected with the mixing zone; with the pre-heating zone being operable to heat its contents to a temperature up to about 350° C. The high pressure pumping means is operable to increase pressure of the oil/water mixture within the apparatus to exceed the critical pressure of water. The reaction zone comprises an interior portion of a main reactor. The reaction zone is fluidly connected with the pre-heating zone, and the main reactor is operable to withstand a temperature that is at least as high as the critical temperature of water. Additionally, the main reactor is operable to withstand pressure in excess of the critical pressure of water. In one embodiment of the present invention, the reaction zone is essentially free of an externally-provided catalyst and essentially free of an externally-provided hydrogen source.

BRIEF DESCRIPTION OF THE DRAWING

So that the manner in which the above-recited features, aspects and advantages of the invention, as well as others that will become apparent, are attained and can be understood in detail, more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE INVENTION

Figure 1:
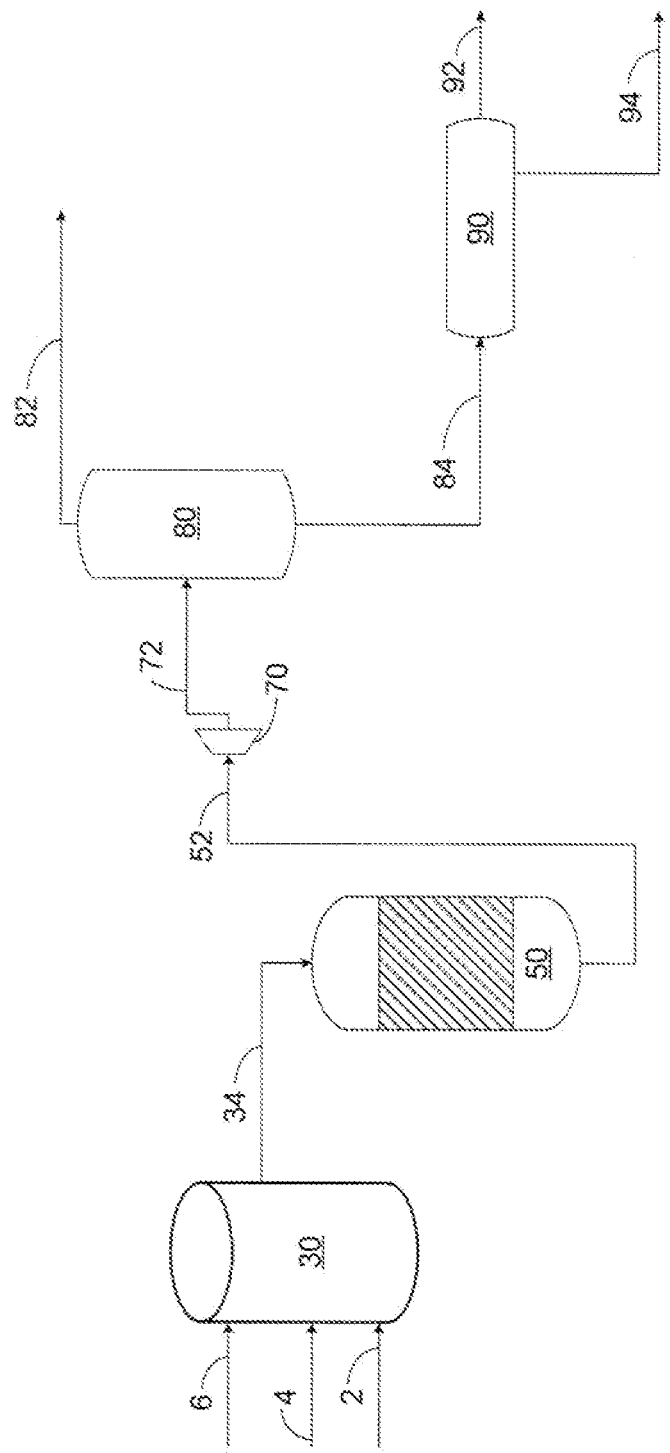
FIG. 1 shows one embodiment of the present invention.

While the invention will be described in connection with a series of embodiments, it will be understood that it is not intended to limit the invention to only those embodiments. On the contrary, it is intended to cover all the alternatives, modifications and equivalence as can be included within the spirit and scope of the invention defined by the claims.

An embodiment of the present invention provides a continuous process for upgrading a crude oil feedstock, made up of heavy crude oil and highly waxy crude oil, that comprises contacting the feedstock with hot, pressurized, supercritical water to produce an improved feedstock having a higher API gravity, fewer asphaltenic and heavy components, higher middle distillate yield, and a reduced amount of sulfur, nitrogen and metallic components. The supercritical water stabilizes radical molecules, which suppresses any recombination of radicals, thereby resulting in diminished coke formation. The improved feedstock is formed without the need for an external supply of hydrogen, hydrogen-generating chemicals, or catalyst.

An embodiment of the present invention also provides a continuous process for upgrading highly waxy crude oil such that the upgraded crude oil has a reduced pour point, reduced amount of asphaltenic components, and increased middle distillate yield. This result is achieved without forming a significant amount of coke and without the need for an external supply of hydrogen or hydrogen-generating chemicals, or catalyst.

According to an embodiment of the present invention, heavy crude oil is mixed with highly waxy crude oil at a slightly elevated temperature to produce a modified heavy crude oil, the slightly elevated temperature exceeding the pour point of the highly waxy crude oil. The modified heavy crude oil is then preferably fed through a high pressure pump in order to increase the pressure of the modified heavy crude oil to a value exceeding the critical pressure of water. The pressurized modified heavy crude oil is then preferably slightly heated to an elevated temperature in the range from 50° F. to 392° F. (10° C. to 200° C.), and more preferably 122° F. to 322° F. (50° C. to 150° C.).) However, if the temperature of the pressurized modified heavy crude oil should exceed 302° F. (150° C.) at this increased pressure, coking can occur within the continuous process, which greatly reduces the efficiency of the overall production. Therefore, a maximum temperature of 302° F. (150° C.) is most preferable for the pressurized modified heavy crude oil. Heating for this purpose can be accomplished, for example, by flowing the modified heavy crude oil and a product stream from a reactor through a heat exchanger.

Water can be added to the heavy crude oil before or after combining with highly waxy crude oil; however, the highly waxy crude oil is preferably mixed with the heavy crude oil before the water. The weight ratio, as measured at room temperature, of the heavy crude oil and the highly waxy crude oil is preferably in the range of 50:1 to 1:1, more preferably in the range of 20:1 to 2:1. The weight ratio, as measured at room temperature, of the modified heavy crude oil and water is in the range of 10:1 to 1:10, more preferably in the range of 5:1 to 1:5. The combination of the heavy crude oil, the highly waxy crude oil and water results in the modified heavy crude oil/water mixture.

In one embodiment, the modified heavy crude oil/water mixture, which is maintained at a pressure exceeding the critical pressure of water, is then introduced into a heating zone, which preferably consists of a heater and tube, to increase the temperature of the modified heavy crude oil/water mixture up to 302° F. to 662° F. (150° C. to 350° C.), and forming the pre-heated mixture. The heating zone is important to the success of the continuous process as it helps reduce overall coke formation. Heating for this purpose can be achieved, for example, by combining the modified heavy crude oil/water mixture with a product stream from a reactor into a heat exchanger. In an alternate embodiment, highly pressurized water can be separately heated to a temperature exceeding its critical temperature prior to mixing with the pressurized modified heavy crude oil.

The pre-heated mixture is then fed into the reaction zone, which is preferably surrounded by another heater, to increase the temperature of the feed stream up to a target temperature of about 705° F. to 1184° F. (374° C. to 640° C.) while maintaining pressure above the critical pressure of water to form the hot adapted-mixture. The hot adapted mixture is then cooled down and undergoes a pressure release by a pressure regulating device, forming the pressure-reduced adapted mixture. The pressure regulating device is preferably a back pressure regulator (BPR), and more preferably more than one BPR in parallel. The pressure-reduced adapted mixture is then separated into gas and liquid portions by a series of suitable separators. The liquid portion is then separated into upgraded oil and the recovered water by an oil-water separator.

Optionally, the recovered water from the oil-water separator is treated with oxygen under supercritical conditions in the oxidation reactor to remove oily impurities contained in the water phase. Oxygen used for this purpose can be supplied from oxygen gas, hydrogen peroxide, organic peroxide, and/or air. The product from the oxidation reactor has high thermal energy released from the oxidation reaction. In alternate embodiments, this energy can be captured and used to heat the pre-heated mixture, the heavy crude oil, the highly waxy crude oil, the modified heavy crude oil, the modified heavy crude oil/water mixture and/or the water feed via a heat exchanger.

The upgraded oil phase recovered from oil-water separator contains a reduced amount of asphaltenic, heavy and waxy components, sulfur, nitrogen and metals than the heavy crude oil. The distillation curve, as measured according to ASTM D-86, is also shifted to lower temperature by this invention.

The continuous process of the present invention can comprise one or more of the following: a crude oil-water mixing stage, a heating stage, a reaction zone stage, a cooling stage, a depressurizing stage, and at least one separating stage. Thermal energy contained in the product stream from the reaction zone stage can be utilized to treat the feed stream in suitably-sized economizing equipment.

Additionally, organic compounds included in the recovered water can be fully oxidized with hot and pressurized water in the presence of oxygen to obtain clean water for recycling and thermal energy that is released from oxidation reactor.

This invention provides a method to convert heavy crude oil to more valuable hydrocarbon feedstock having: a higher API gravity; higher distillation yield toward middle distillates; lower content of impurities, such as sulfur, nitrogen and metal; and lower contents of asphaltenic and heavy fractions. These properties are achieved all without forming a significant amount of coke and without external supply of hydrogen or hydrogen-generating chemicals. Products made by this invention are suitable for conventional refining processes that have limited capability for hydrocracking and hydrotreating of fractions derived from heavy crude oil.

The continuous process of the present invention is further demonstrated by the following illustrative embodiment, which is not intended to limit in any way the continuous process of the present invention.

ILLUSTRATIVE EMBODIMENT

Properties of heavy crude oil that are applicable to the method disclosed in the present invention are listed in Table 1. Residual fraction having boiling points above 1050° F. (565.6° C.) is 23.6 vol % of whole range heavy crude oil and has asphaltenes as much as 8.2 wt %.

TABLE 1

| Property | Value |
|---|---|
| Gravity, °API | 27.4 |
| Sulfur, Total Weight % | 2.90 |
| Reid Vapor Pressure, psi | 6.5 |
| Pour Point, (Upper), ° F. | 0 |
| Salt, Lbs. NaCl/1000 BBL (PTB) | 2 |
| Ash, wt ppm | 268 |
| Vanadium, wt ppm | 59 |
| Microcarbon Residue, wt % | 8.1 |
| Nickel, wt ppm | 19 |
| Nitrogen, wt ppm | 1670 |
| Heating Value, Gross, BTU/Lb | 18620 |
| Kin Viscosity, @ 70° F., SUS | 191.97 |
| Kin Viscosity, @ 100° F., SUS | 68.07 |
| Debutanized Crude Gravity, °API | 26.40 |
| Characterization Gravity, °API | 27.80 |

Properties of waxy crude oil that are applicable to the method disclosed in the present invention are listed in Table 2. Pour point is very high, 105° F. (40.6° C.), which means the highly waxy crude oil is solid-state at room temperature (68° F. to 86° F. (20° C. to 30° C.)).

TABLE 2

| Property | Value |
|---|---|
| Gravity, °API | 34.3 |
| Sulfur, Total Weight % | 1.8 |
| Reid Vapor Pressure, psi | 4.1 |
| Pour Point, (Upper), ° F. | 105 |
| Salt, Lbs. NaCl/1000 BBL (PTB) | 1 |
| Ash, wt ppm | 33 |
| Vanadium, wt ppm | 15 |
| Microcarbon Residue, wt % | 3.84 |
| Nickel, wt ppm | 4 |
| Nitrogen, wt ppm | 542 |
| Heating Value, Gross, BTU/Lb | 19091 |
| Kin Viscosity, @ 70° F., SUS | 55.18 |
| Kin Viscosity, @ 100° F., SUS | 42.61 |
| Debutanized Crude Gravity, °API | 33.20 |
| Characterization Gravity, °API | 28.60 |

In one embodiment, heavy crude oil and highly waxy crude oil having properties as outlined in Table 1 and Table 2, respectively, are processed by the method of the present invention. Heavy crude oil is mixed with highly waxy crude oil water in the ratio of 5:1 wt/wt at 158° F. (70° C.) with an impeller to form a modified heavy crude oil. Using an impeller, the modified heavy crude oil is mixed with water in the ratio of 1:5 wt/wt at 158° F. (70° C.) to form a modified heavy crude oil/water mixture.

This modified heavy crude oil/water mixture is then fed, using a high pressure pump, into a heating zone to raise its temperature up to 482° F. (250° C.), forming a pre-heated mixture. The pre-heated mixture is then introduced into a reaction zone while maintaining pressure at 25 MPa and a target temperature of 842° F. (450° C.). The pre-heated mixture has a residence time of 10 minutes within the reaction zone. A hot adapted-mixture, which is the output from the reaction zone, is then used to heat the modified heavy crude oil/water mixture via a heat exchanger before it is released to about 0.1 MPa by a back pressure regulator. Following this pressure release, the hot adapted mixture is then fed into a liquid-gas separator, wherein the liquid portion from liquid-gas separator is then fed into an oil-water separator. The upgraded oil is then collected and analyzed. Total liquid yield is above 95 vol %; the API gravity is 45, and the pour point of the upgraded oil is lower than 10° F. Conversion of asphaltene contained in residue above 1050° F. was above 80% based on weight.

Now turning to FIG. 1, heavy crude oil [4] is combined with water feed [2] in the presence of highly waxy crude oil [6] in mixing zone [30] to create modified heavy crude oil/water mixture [34]. Mixing zone [30] can be simply a "T" in the line allowing mixing or other mixing devices known in the art. Modified heavy crude oil/water mixture [34] is then fed into main reactor [50] and subjected to increased temperatures and pressures, which preferably exceed the critical temperature and critical pressure of water, which are about 705° F. (374° C.) and about 22.1 MPa, respectively. During this period of intense heat and pressure, modified heavy crude oil/water mixture [34] undergoes cracking and forms hot adapted-mixture [52], which is then sent to pressure regulating device [70]. Hot adapted-mixture [52] is brought back down to a pressure close to atmospheric, resulting in pressure-reduced adapted mixture [72]. Pressure-reduced adapted mixture [72], which contains both gases and liquids, is then fed into liquid-gas separator [80] to remove gas portion [82] from liquid portion [84]. Liquid portion [84] is then fed into oil-water separator [90], which yields upgraded oil [92] and recovered water [94]. Upgraded oil [92] is an upgraded version of both heavy crude oil [4] and highly waxy crude oil [6], having reduced amounts of asphaltene, sulfur, nitrogen or metal containing substances as compared to heavy crude oil [4]. Upgraded oil [92] also has improved flow properties resulting from a lower pour point, which allows upgraded oil [92] to be transported to other processes using pipes or tankers.

Figure 2:
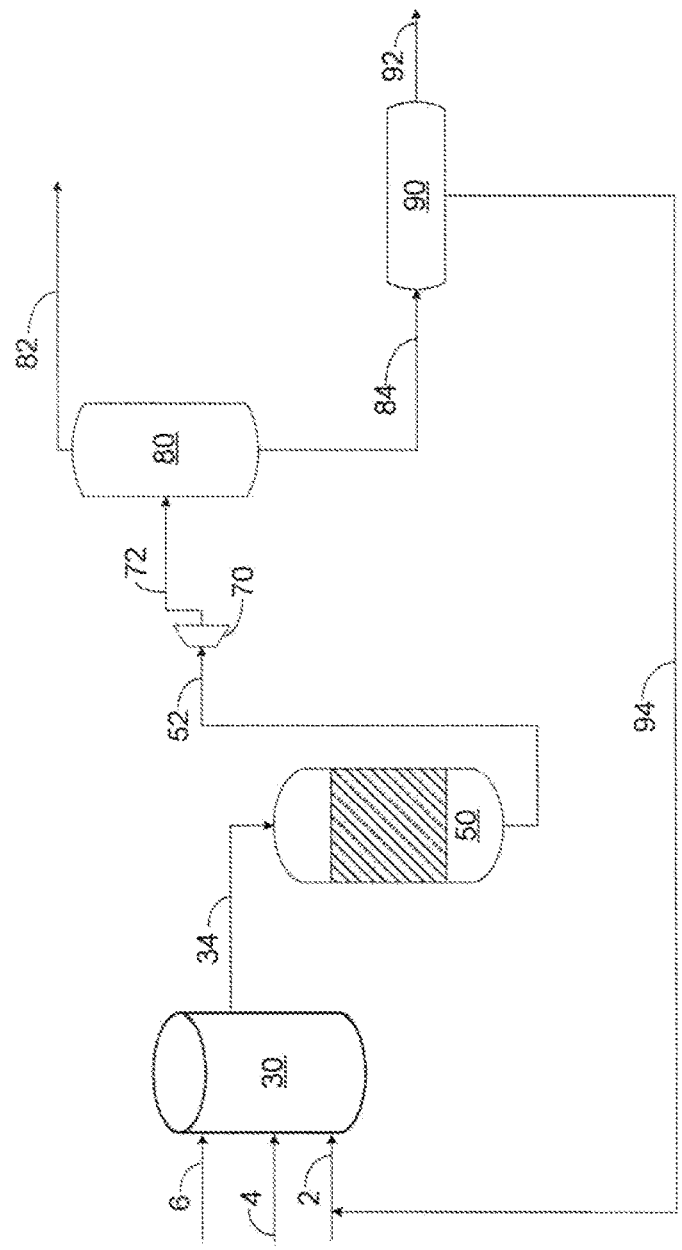
FIG. 2 shows an embodiment of the invention that includes a recycle stream.

FIG. 2 shows an alternate embodiment wherein at least a portion of recovered water [94] is used as a recycle stream and is combined with water feed [2].

Figure 3:
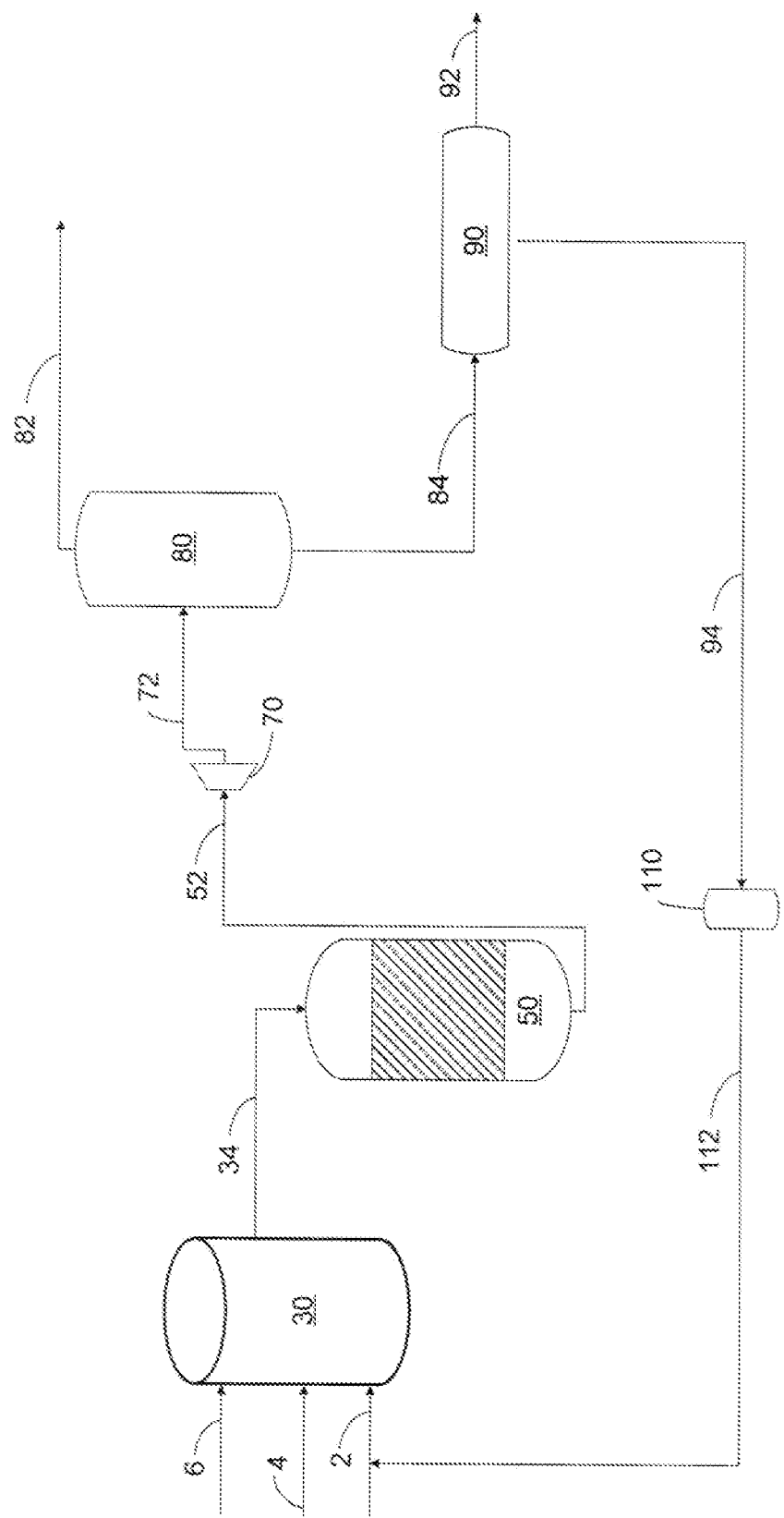
FIG. 3 shows an alternate embodiment of the invention.

FIG. 3 demonstrates a further embodiment in which oily residue is removed from recovered water [94], making treated water stream [112] via oxidation reactor [110]. Treated water stream [112] is then combined with water feed [2].

Figure 4:
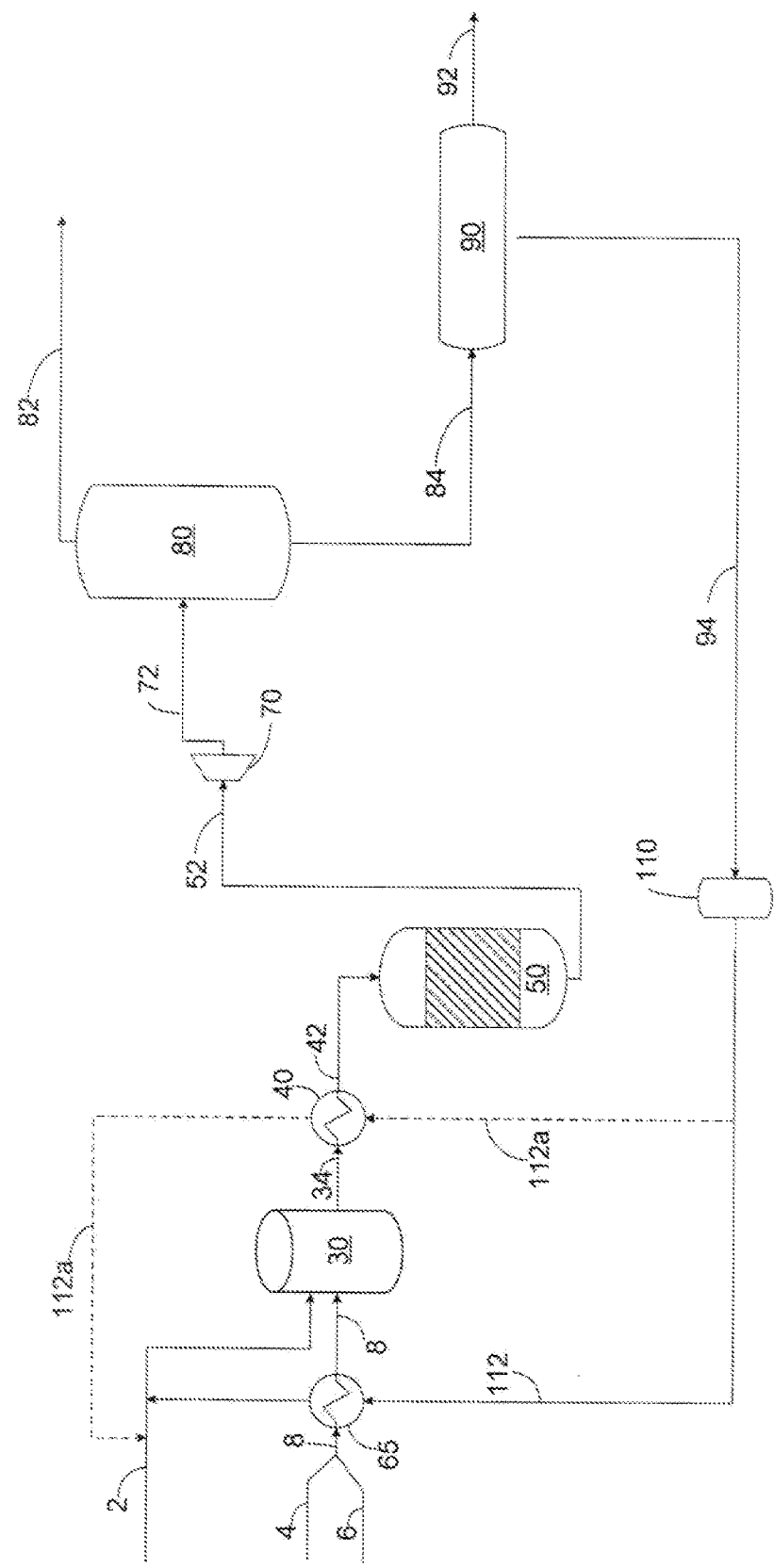
FIG. 4 shows an alternate embodiment of the invention.

FIG. 4 is another embodiment in which heavy crude oil [4] is combined with highly waxy crude oil [6] to form modified heavy crude oil [8]. Modified heavy crude oil [8] is then heated, using modified heavy oil heater [65], which is preferably a heat exchanger, and then sent to mixing zone [30] where it is combined and mixed with water feed [2] to form modified heavy crude oil/water mixture [34]. Modified heavy crude oil/water mixture [34] is then sent to heating zone [40], where it is preferably heated to a temperature of about 482° F. (250° C.), before being fed into main reactor [50]. The continuous process is then similar to that as shown in FIG. 3, with the additional step of passing treated water stream [112] through modified heavy oil heater [65] before combining with water feed [2]. The dashed line represents an alternate path, wherein treated water stream [112a] passes through heating zone [40] rather than modified heavy oil heater [65] in order to heat modified heavy crude oil/water mixture [34] rather than modified heavy crude oil [8].

Figure 5:
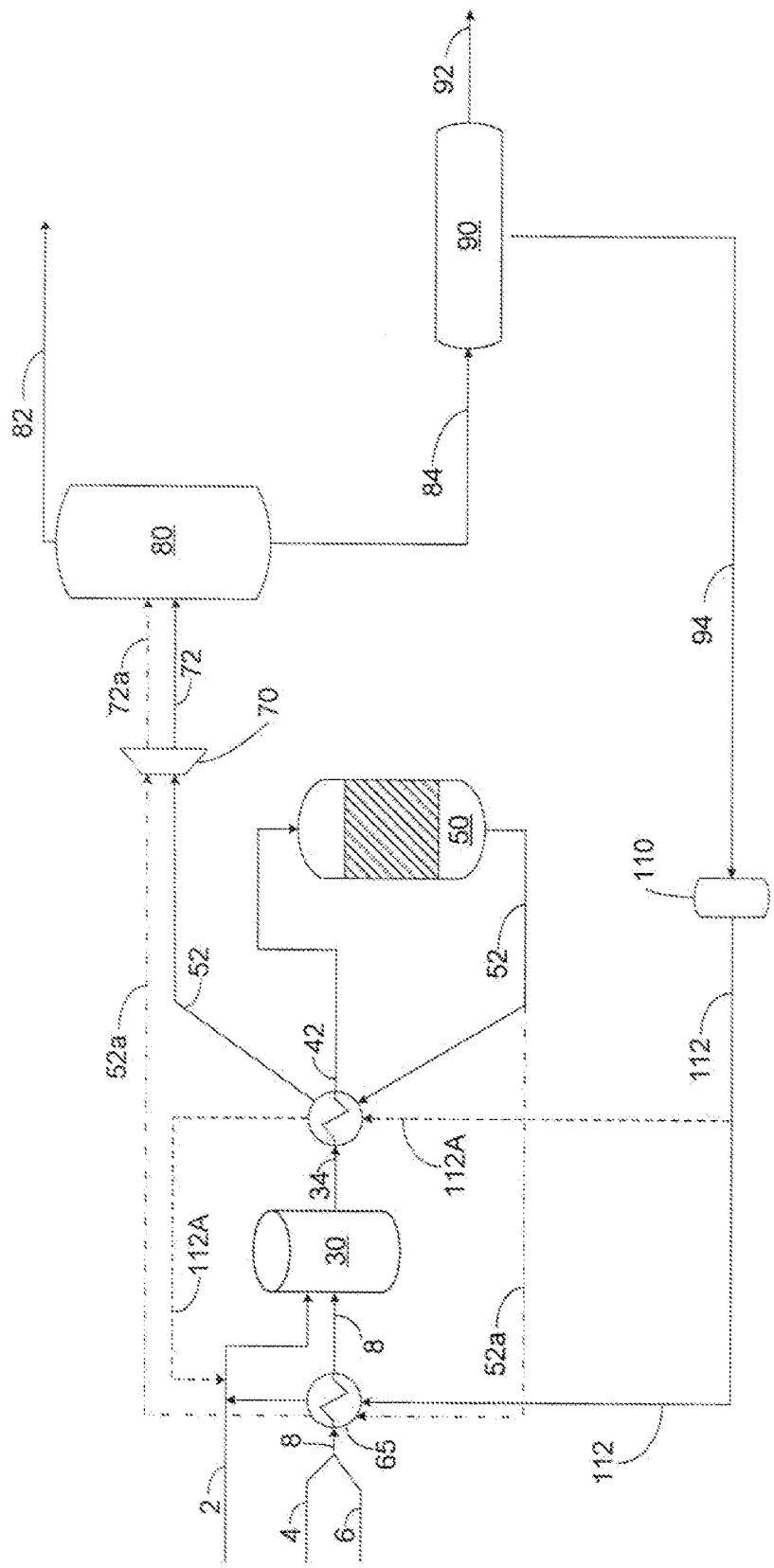
FIG. 5 shows an alternate embodiment of the invention.

FIG. 5 shows an alternate embodiment in which the thermal energy contained in hot adapted mixture [52] is used for heat exchange upstream of the liquid separation step. In one embodiment, the thermal energy from main reactor [50] is used for heating in heating zone [40] and the thermal energy released from oxidation reactor [110] is used to heat modified heavy crude oil [8] via modified heavy oil heater [65]. The dashed lines represent alternate paths, wherein treated water stream [112a] passes through heating zone [40] rather than modified heavy oil heater [65], and hot adapted-mixture [52a] passes through modified heavy oil heater [65] rather than heating zone [40].

Figure 6:
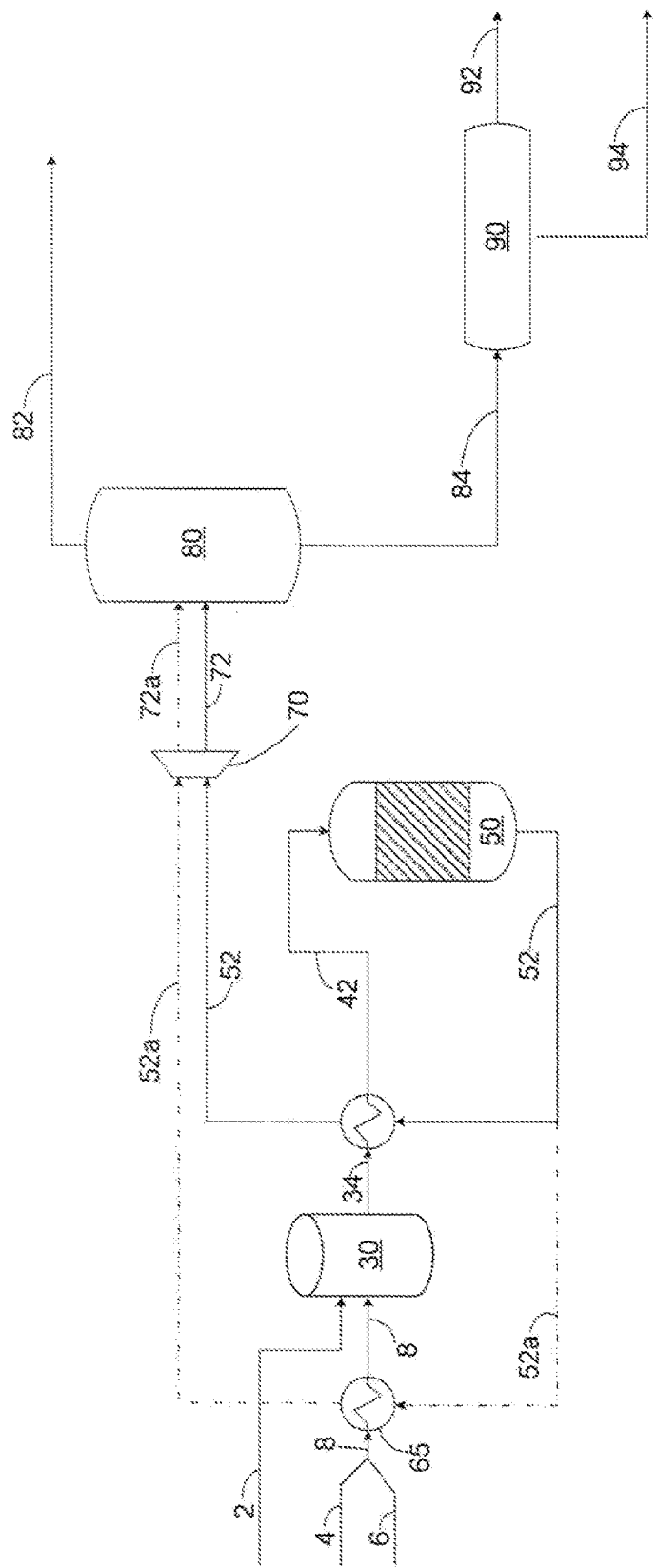
FIG. 6 shows an alternate embodiment of the invention.

FIG. 6 shows an alternate embodiment to that shown in FIG. 1, in which the thermal energy contained in hot adapted mixture [52] is used as the heat source for heating zone [40]. The dashed line represents an alternate path, wherein the thermal energy is used as the heat source for modified heavy oil heater [65] instead of heating zone [40].

Figure 7:
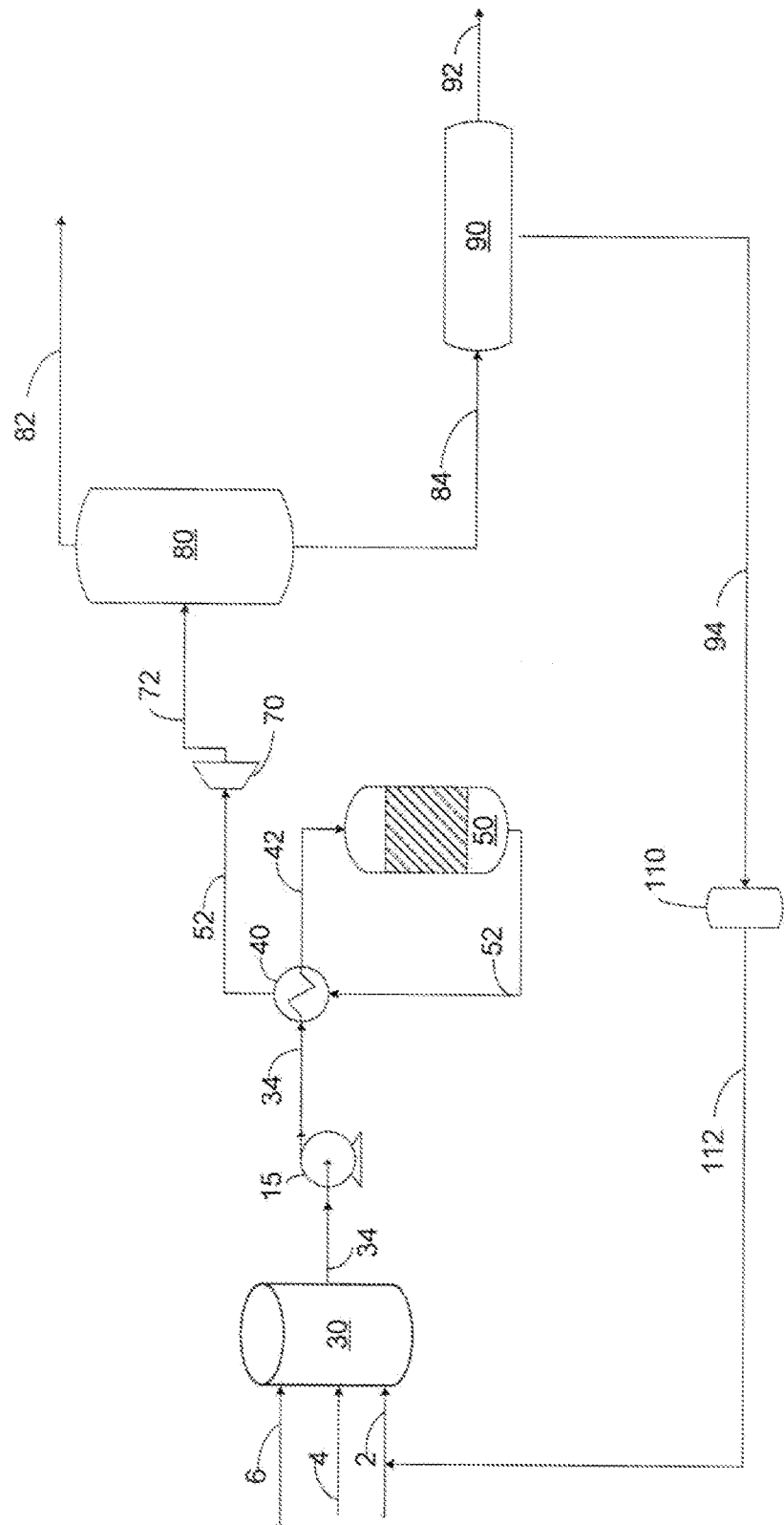
FIG. 7 shows an alternate embodiment of the invention.

FIG. 7 shows an alternate embodiment wherein high pressure pump [15] is used to feed modified heavy crude oil/water mixture [34] to heating zone [40] to form pre-heated mixture [42] before entering main reactor [50]. In main reactor [50], pre-heated mixture [42] is subjected to increased temperatures and pressures, which preferably exceed the critical temperature and critical pressure of water, which are about 705° F. (374° C.) and about 22.1 MPa, respectively. During this period of intense heat and pressure, pre-heated mixture [42] undergoes cracking and forms hot adapted-mixture [52]. Hot adapted-mixture [52] passes through heating zone [40] in order to transfer heat energy to modified heavy crude oil/water mixture [34]. Hot adapted-mixture [52] is then sent to pressure regulating device [70], where it is depressurized, preferably to 0.1 MPa, to form pressure-reduced adapted mixture [72].

Figure 8:
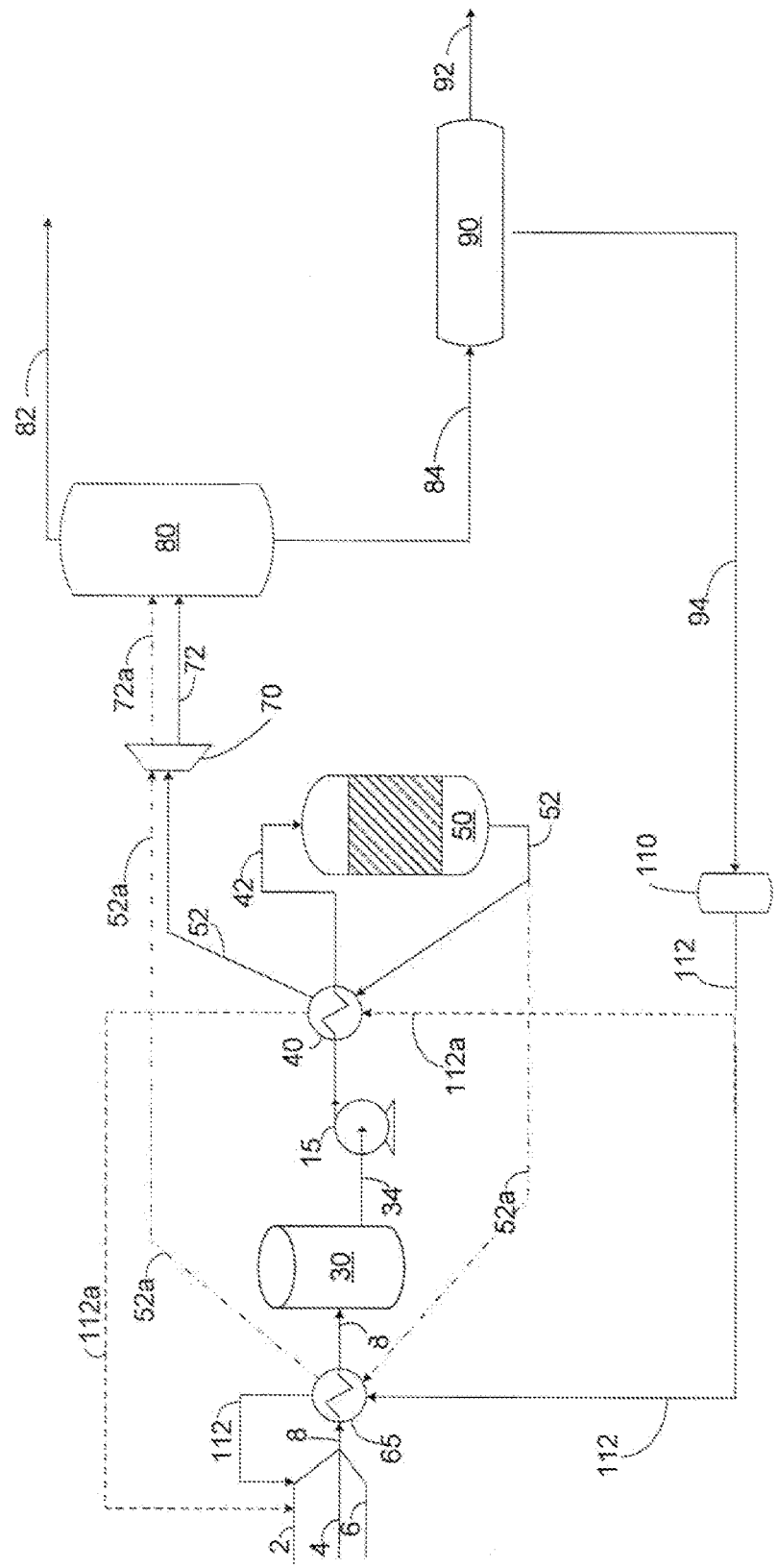
FIG. 8 shows an alternate embodiment of the invention.

FIG. 8 shows an alternate embodiment as that described in FIG. 7, wherein the thermal energy released from oxidation reactor [110] is used for heat exchange upstream of the liquid separation step. In one embodiment, the thermal energy from main reactor [50] is used for heating zone [40] and the thermal energy released from oxidation reactor [110] is used to heat water feed [2], heavy crude oil [4], and highly waxy oil [6] via modified heavy oil heater [65]. The dashed lines represent alternate paths, wherein treated water stream [112a] passes through heating zone [40] rather than the modified heavy oil heater [65], the hot adapted-mixture [52a] passes through modified heavy oil heater [65] rather than heating zone [40].

Figure 9:
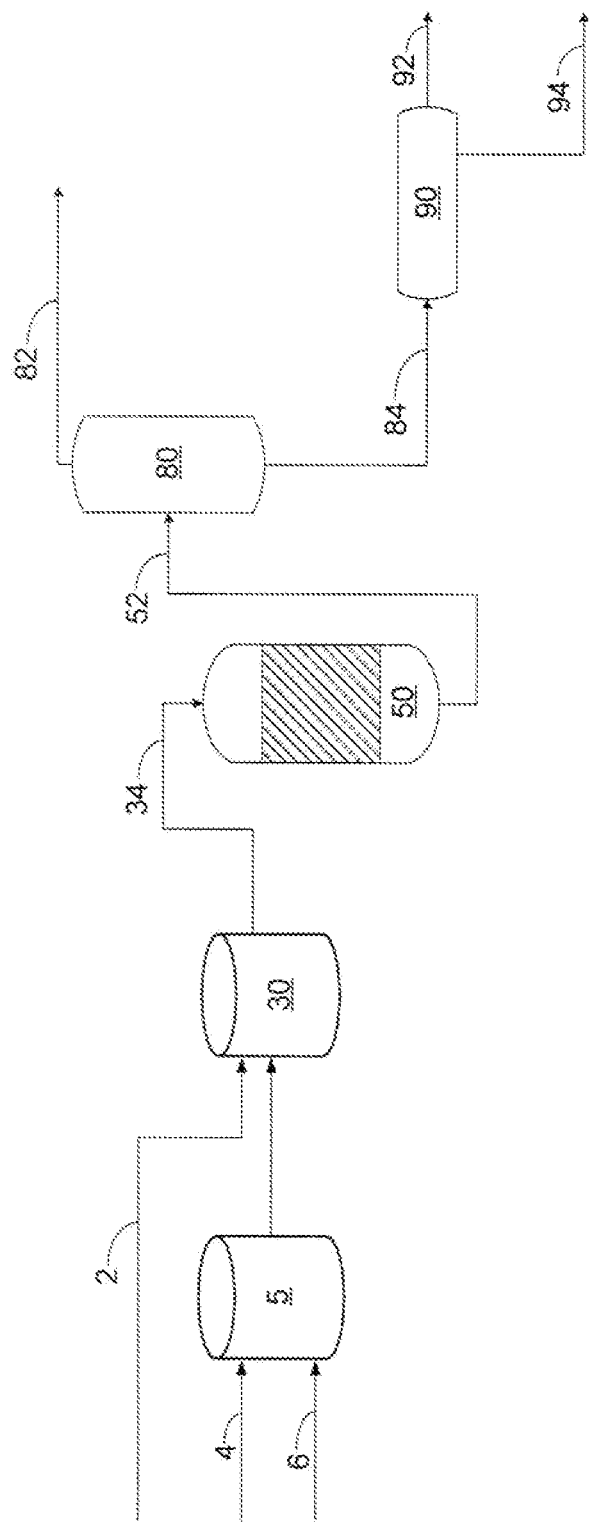
FIG. 9 shows an alternate embodiment of the invention.

In FIG. 9, heavy crude oil [4] is combined with highly waxy crude oil [6] into crude oil mixer [5] to create modified heavy crude oil [8], wherein the mixing ratio of heavy crude oil [4] to highly waxy crude oil [6] is in the range of 50:1 wt/wt and 1:1 wt/wt, more preferably in the range of 20:1 wt/wt and 2:1 wt/wt. Additionally, the temperature of crude oil mixer [5] should preferably be in the range from 50° F. to 392° F. (10° C. to 200° C.), more preferably in the range from 122° F. to 322° F. (50° C. to 150° C.).

Modified heavy crude oil [8] is combined with water feed [2] in mixing zone [30] to form modified heavy crude oil/water mixture [34], wherein the weight ratio of modified heavy crude oil [8] to water feed [2] is in the range of 10:1 wt/wt and 1:10 wt/wt, more preferably in the range of 5:1 wt/wt and 1:5 wt/wt. Modified heavy crude oil/water mixture [34] is then fed into main reactor [50], wherein modified heavy crude oil/water mixture [34] is subjected to increased temperatures and pressures, which preferably exceed the critical temperature and critical pressure of water, which are about 705° F. (374° C.) and about 22.1 MPa, respectively.

During this period of intense heat and pressure, modified heavy crude oil/water mixture [34] undergoes cracking and forms hot adapted-mixture [52]. Hot adapted-mixture [52] is then separated into gas portion [82] and liquid portion [84] via liquid-gas separator [80]. The liquid portion [84] then travels to oil-water separator [90], wherein liquid portion [84] is separated into upgraded oil [92] and recovered water [94], whereby upgraded oil [92] is an upgraded heavy crude oil having reduced amounts of asphaltene, sulfur, nitrogen and metal containing substances in comparison with the heavy crude oil.

Figure 10:
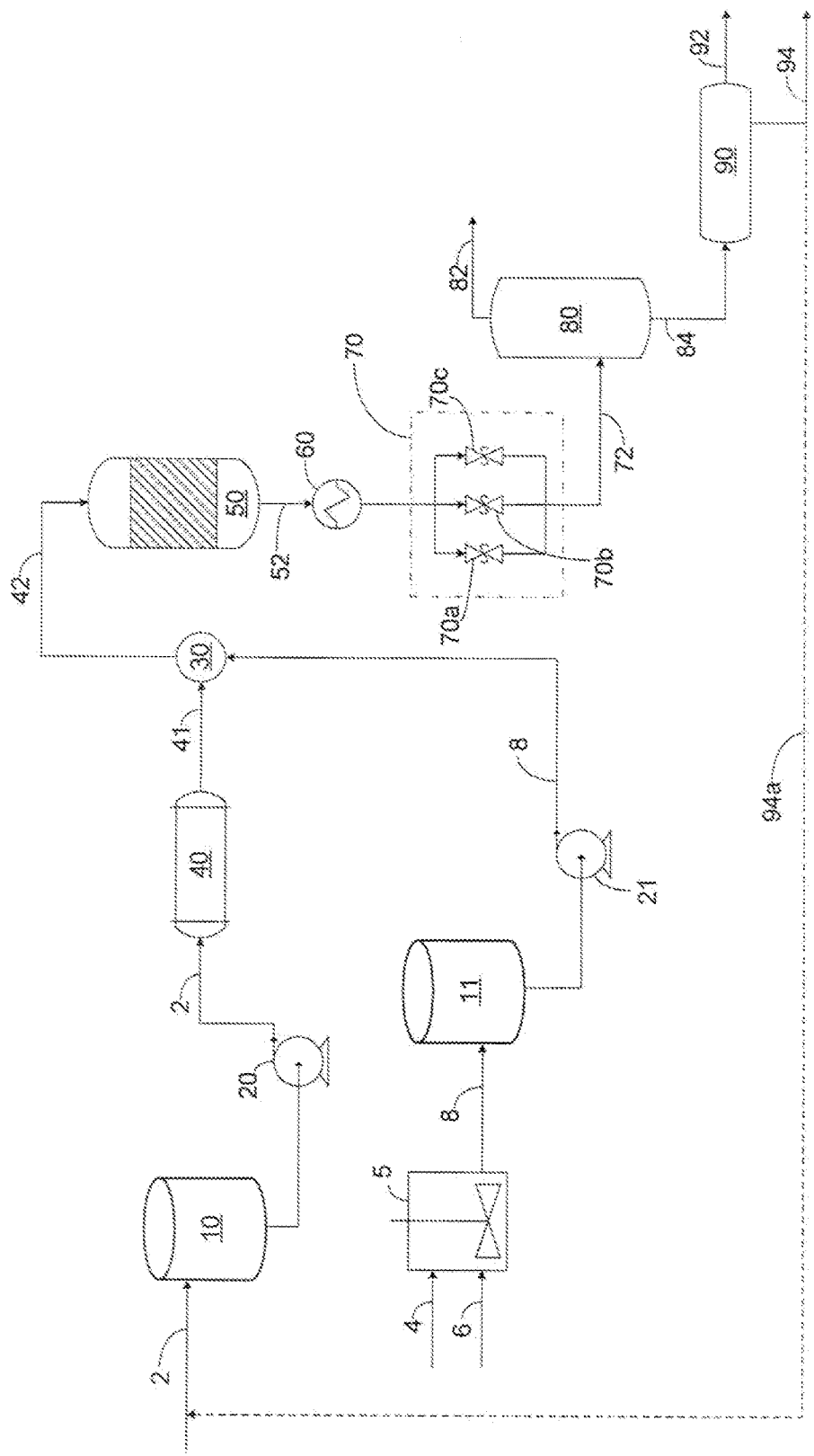
FIG. 10 shows an alternate embodiment of the invention.

FIG. 10 represents one embodiment in which water feed [2] is pre-heated to supercritical conditions prior to mixing zone [30]. In this embodiment, water feed [2] is fed into water storage tank [10], where the water feed [2] is subsequently pumped into the continuous process using high pressure metering water pump [20]. However, instead of first mixing with modified heavy crude oil [8], water feed [2], which is at a pressure exceeding the critical pressure of water, undergoes heating in heating zone [40] to form heated water stream [41], wherein heated water stream [41] is in a supercritical state.

Highly waxy crude oil [6] and heavy crude oil [4] are fed into crude oil mixer [5], which is preferably a stirred tank type mixer, and mixed together forming modified heavy crude oil [8]. Modified heavy crude oil [8] is slightly heated to allow for adequate flowing. Modified heavy crude oil [8] is similarly fed into modified heavy crude oil storage tank [11], where modified heavy crude oil [8] is subsequently pumped into the continuous process at mixing zone [30] using high pressure metering modified heavy crude oil pump [21]. Mixing zone [30] can be simply a "T" in the line allowing mixing or other mixing devices known in the art. Prior to mixing zone [30], modified heavy crude oil [8], which is at a pressure exceeding the critical pressure of water, is at a temperature that allows for flow; however, preferably not exceeding 150 degrees C. Modified heavy crude oil [8] and heated water stream [41] combine at mixing zone [30], which is preferably near main reactor [50], to create pre-heated mixture [42].

Pre-heated mixture [42] enters main reactor [50], wherein the temperature and pressure are near to or exceed the critical point of water, such that at least some of the hydrocarbons of pre-heated mixture [42] undergo cracking, forming hot adapted-mixture [52], main reactor [50] being essentially free of an externally-provided catalyst and essentially free of an externally-provided hydrogen source. Hot adapted-mixture [52] is then cooled using any acceptable means of cooling [60], preferably a heat exchanger, creating cooled adapted-mixture [62]. Cooled adapted-mixture [62] is then depressurized by pressure regulating device [70] to create pressure-reduced adapted mixture [72]. In one embodiment, pressure regulating device [70] comprises at least two pressure regulating valves, and more preferably three pressure regulating valves [70a, 70b, 70c] connected in a parallel fashion. This arrangement advantageously provides for continued operation in the event the primary relief valve becomes plugged. Pressure-reduced adapted mixture [72] then enters liquid-gas separator [80], wherein pressure-reduced adapted mixture [72] is separated into gas portion [82] and liquid portion [84]. Liquid portion [84] is then fed into oil-water separator [90] to yield upgraded oil [92] and recovered water [94]. In an alternate embodiment, recovered water [94a] can be recycled upstream high pressure metering water pump [20].

While FIGS. 4-6, and 10 show embodiments in which highly waxy crude oil [6] is combined with heavy crude oil

[4] prior to the introduction of water feed [2], these are merely the preferred embodiments. As stated earlier, water feed [2] can be combined with heavy crude oil [4] before or after combining with highly waxy crude oil [6].

While the invention has been shown or described in only some of its forms, it should be apparent to those skilled in the art that it is not so limited, but is susceptible to various changes without departing from the scope of the invention. For example, steps can be performed in a different order to reach the same desired goal and heating can be affected in a variety of ways. Similarly, the process can be practiced as a batch or continuous-batch process without departing from the scope of the invention.

I claim:

1. An apparatus for upgrading heavy crude oil and highly waxy crude oil in an environment free of an externally supplied catalyst or externally supplied hydrogen source, the apparatus comprising:
   a mixing zone operable to combine a heavy crude oil, which has an API gravity of less than 30°, and a highly waxy crude oil, which has a pour point temperature greater than room temperature and has an API gravity of greater than 30°, with a water feed at a slightly elevated temperature to create a modified oil/water mixture, wherein the modified oil/water mixture is in the absence of externally supplied hydrogen;
   a heater and tube in a pre-heating zone that is fluidly connected with the mixing zone, the pre-heating zone operable to heat the modified oil/water mixture to a temperature up to 350° C.;
   a high pressure pumping means, the high pressure pumping means operable to increase pressure of the modified oil/water mixture to at least the critical pressure of water to produce a pre-heated mixture;
   a reaction zone comprising an inner portion of a main reactor, wherein the reaction zone is fluidly connected with the pre-heating zone; the main reactor being operable to withstand a temperature that is at least as high as the critical temperature of water; the main reactor being operable to withstand pressure in excess of the critical pressure of water, the reaction zone being essentially free of an externally-provided catalyst and essentially free of an externally-provided hydrogen source;
   a pressure regulating device;
   a liquid-gas separator fluidly connected to the pressure regulating device, the liquid-gas separator operable to create a liquid stream and a gas stream; and
   a water-oil separator fluidly connected to the liquid-gas separator via the liquid stream, the water-oil separator operable to create a recovered water stream and an upgraded hydrocarbon stream.

2. The apparatus of claim 1 where the pressure regulating device comprises a plurality of back pressure regulators connected in a parallel fashion.

3. The apparatus of claim 1 where the recovered water stream can be recycled and combined with the water feed.

4. The apparatus of claim 3 further comprising an oxidation reactor fluidly connected with the recovered water stream, the oxidation reactor operable to clean the recovered water stream via oxidation.

5. The apparatus of claim 1, where the residence time of the pre-heated mixture within the reaction zone is between 0.1 and 10 minutes.

* * * * *